United States Patent Office 2,804,516
Patented Aug. 27, 1957

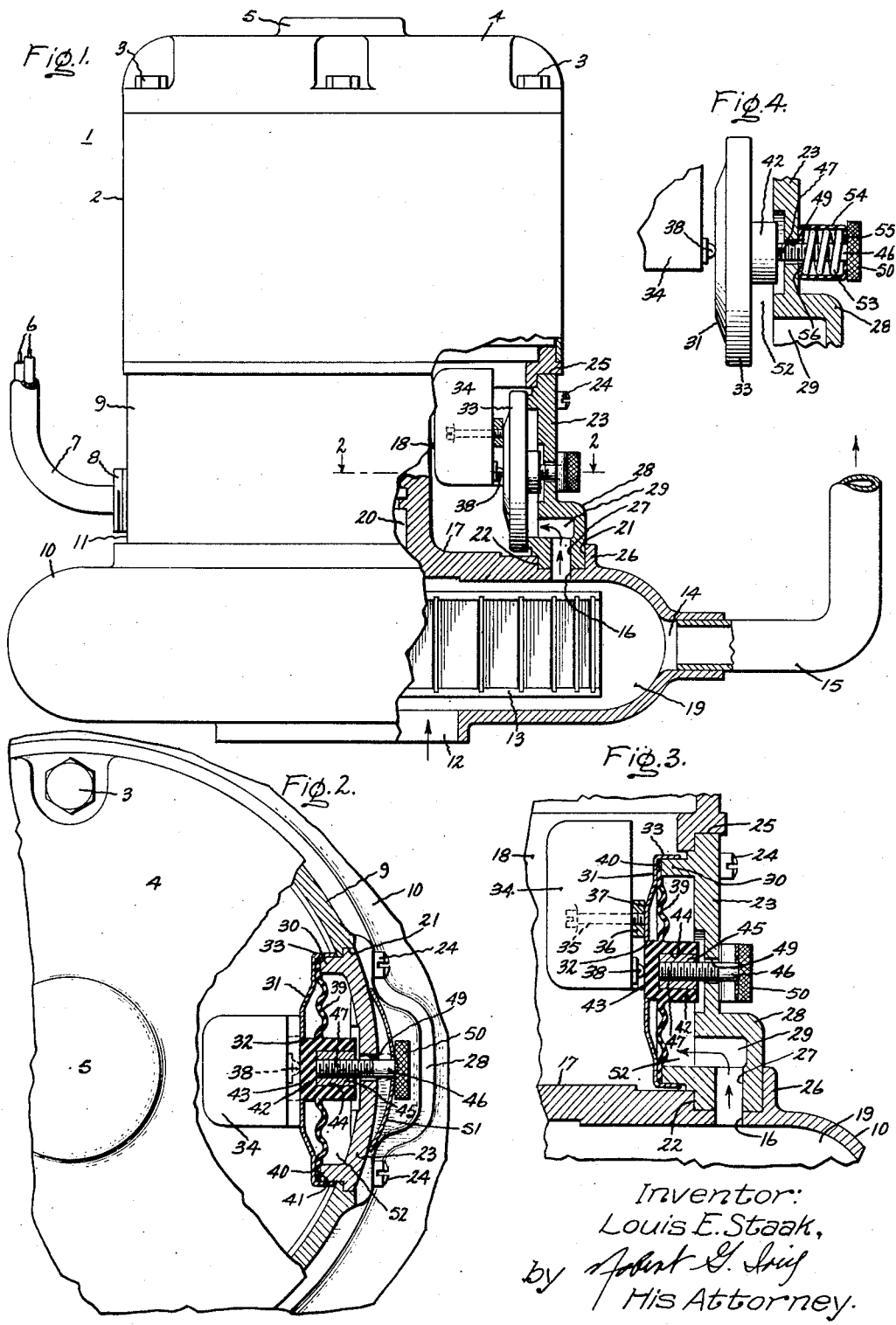

2,804,516

SUMP PUMP LIQUID LEVEL CONTROL SWITCH

Louis E. Staak, Fort Wayne, Ind., assignor to General Electric Company, a corporation of New York Application February 25, 1954, Serial No. 412,506

3 Claims. (Cl. 200—83)

This invention relates to sump pumps, and more particularly to an improved liquid level control switch therefor.

Sump pumps are generally utilized to keep the liquid level in a given space at an approximately constant level. Such pumps are commonly actuated by an electric motor which may or may not be submersible below the level of the liquid to be pumped. It is clear that where a pump is used for such a purpose it is highly desirable to have the actuation of the driving means dependent upon the level of the liquid in the sump; as a result, a large variety of means for sensing the liquid level are available. It is often required that the pump be kept operating until the liquid level falls below the pump inlet. Since this is not normally a standard used to commence operation of the pump, the control means must of necessity be made sensitive to both the starting level and the level at which the pump will cease operating. It is highly desirable that the means to achieve this end be made as simple and as economical as possible while retaining the ability to sense both liquid levels at the proper time.

In addition, the liquid level at which the pump is required to start may vary depending upon the particular application. Therefore, it is a further prerequisite in such apparatus that means be provided to adjust the liquid level at which the pump will commence operating. At other times it may be necessary to operate the pump where the liquid level is so low that it will not automatically actuate the pump. In such an event it becomes desirable that means be provided to permit manual actuation of the pump while retaining the automatic stopping when the liquid level descends below the pump inlet. These additional adjusting and manual means should, where a high rate of production is envisioned, be reduced to the utmost in simplicity with a maximum of reliability.

It is therefore, an object of this invention to provide an improved liquid level control switch for a sump pump which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspects, provides a liquid level control switch for a pump motor assembly, which includes a resilient means, such as a diaphragm, which is preferably secured within the motor housing. The diaphragm may be located above the pump impeller with an opening being provided from the pump chamber to one side of the diaphragm. When the pump is immersed in the sump liquid, the liquid will enter through the pump inlet and press against the diaphragm. At a certain head of liquid the diaphragm is forced to move and thereby operate an electric switch. Once the pump is started, it forces the liquid in such a direction that pressure is maintained on the diaphragm until the liquid level falls below the level of the pump impeller. At this point the pump will no longer force liquid against the diaphragm, and the diaphragm will return to its previous position and permit the switch to open.

A member extending through the housing is secured to the diaphragm and is provided with biasing means which tends to pull the diaphragm away from the switch means. The member secured to the diaphragm may be adjusted to cause more or less force to be exerted on the diaphragm to pull it away from the switch means. In addition, since the member extends through the housing, manual pressure may be exerted from the outside to push the diaphragm against the switch to start operation of the pump. It is clear that, since stopping of the pump depends upon the liquid level with respect to the pump impeller, whether the pump is started automatically or manually has no bearing upon the automatic stopping of the pump.

In one modification of this invention, the member extending through the pump housing may be so constructed as to cause the housing opening to be hermetically closed and prevents liquid under pressure against the diaphragm from leaking out of the housing. This is a particularly desirable feature in those applications where splash, spray, or leakage may adversely affect the pump output.

In the drawing:

Figure 1 is a side view of a pump-motor combination, partly cut away and partly in cross section;

Figure 2 is a view along 2—2 of Figure 1;

Figure 3 is a fragmentary view, partly in cross section, of the improved liquid level control means shown in Figure 1; and Figure 4 is a view, partly in cross section, of a modification of the improved liquid level control means of this invention.

Referring now to Figures 1, 2, and 3 of the drawing, an electric driving motor is indicated generally by the numeral 1. Driving motor 1 is enclosed in motor housing 2 which is secured by bolts 3 to an end flange 4 having a recess 5 provided therein to accommodate the bearing (not shown) of motor 1. Motor 1 receives power through electric leads 6 which are enclosed in liquid tight covering 7 and which enter the motor housing through opening 8. Leads 6 enter a somewhat narrowed down portion 9 of housing 2; the purpose of part 9 of housing 2 will be described in detail hereafter.

Motor 1 is secured to pump housing 10, as at 11, by any desired means such as welding, bolting, or providing mating threads on the motor housing part 9 and on the pump housing 10. Pump housing 10 is provided with an opening 12 which is the pump inlet. A pump impeller 13 is adapted to rotate in an enclosure 19 formed within housing 10 and thereby force the liquid in the sump through an opening 14, provided on the periphery of housing 10, and into means such as pipe 15 to conduct the liquid away from the pump. A small opening 16 is also provided in pump housing 10 for a purpose which will be hereinafter explained. An end flange 17 is secured to housing portion 9 of motor 1 and to housing 10 of the pump to separate the motor enclosure from the pump enclosure. Motor 1 drives pump impeller 13 by means of a vertical shaft (not shown). This shaft extends through end flange 17, and a seal 20 of any standard type is provided to prevent the pumped liquid from entering the motor enclosure 18. It will be understood that the description of the motor, of the pump, and of the securement of the two has been made purely for purposes of illustration and that any type of driving means susceptible of being actuated by a liquid level control may be used.

It will be observed that an opening 21 is provided in housing part 9 and that end flange 17 terminates in rabbet surface 22 in one part of its periphery. As a result, end flange 17 does not extend sufficiently far to block opening 16 in pump housing 10. A housing closure member 23 fits within the opening 21 in housing part 9, and may be secured to housing part 9 by any desired means, such as bolts 24. Rabbets such as 25 may be provided in the motor housing to engage the edges of member 23. At its bottom, member 23 fits within flange 26 of pump housing 10 and against rabbet 22 of end flange 17, thereby completing the enclosure of the pump and motor apparatus. An opening 27 is provided in closure 23 which, when the closure is in place, forms a continuation of opening 16 in pump housing 10. Closure member 23 is formed with an outward flange 28 to provide a passage 29, which is a continuation of openings 16 and 27 and is connected to the pump enclosure 19 by these openings.

Closure member 23 has a circular flange 30 extending away from its inner surface. A retainer member 31 having a central opening 32 has an outer flange 33 by means of which it may be snapped over flange 30 and secured thereto. A switch mechanism of any standard type, indicated at 34, is firmly attached to retainer member 31. This may be done, as shown, by providing a bolt 35 which secures switch 34 to a metal piece 36 which in turn may be welded, as at 37, to retainer member 31. Switch 34 is adapted to complete an electrical circuit to energize motor 1 upon depression of a button 38 which extends therefrom opposite the opening 32 of retainer member 31.

A diaphragm 39 is secured at its outer periphery 40 between retaining member 31 and the outer surface 41 of flange 30. Diaphragm 39 has its center formed as a cup shaped member 42, whose solid bottom 43 extends through opening 32 of retainer member 31 and is positioned so as to be in close proximity with button 38 when diaphragm 39 is in its normal position. The recess 44 of cup-shaped member 42 faces closure member 23; an internally threaded female member 45 is secured within recess 44 of member 42, and an elongated member 46 having a threaded portion 47 is screwed into female member 45. Member 46 extends through an opening 49 provided therefor in closure member 23, and terminates in a knurled head 50. Member 46 is long enough so that knurled head 50 is spaced from the outside of closure member 23. A leaf spring 51 is placed between closure member 23 and head 50 so that it presses against head 50 to bias member 46 (and, consequently, cup-shaped member 42 of diaphragm 39) away from button 38.

Diaphragm 39, closure member 23, and flange 30 of the closure member together form an enclosed chamber 52 which is connected to pump enclosure 19 by means of openings 16 and 27 and passage 29. When member 46 is turned clockwise it pulls diaphragm 39 toward it and tends to decrease the space between head 50 and closure member 23. This increases the tension of spring 51 thereby requiring more force on diaphragm 39 before cup-shaped member 42 will move sufficiently to cause depression of button 38 and the completion of an electric circuit through switch 34. Turning member 46 in a counterclockwise direction will have the opposite result of decreasing the tension on the spring and of decreasing the pressure needed to cause completion of a circuit through circuit breaker 34. It will also be seen that manual pressure may be applied to push member 46 straight in against the action of spring 51, and thereby cause cup-shaped member 42 to advance and depress button 38.

The operation of the improved liquid level control switch of this invention will now be explained. When the combined motor and pump shown in Figures 1–3 of the drawing are placed in a sump, pump inlet 12 will be approximately at the bottom of the sump. Liquid will, therefore, enter enclosure 19 through inlet 12, and will flow through openings 16 and 27 and passage 29 into enclosure 52. When the liquid is at a predetermined level there will be sufficient pressure exerted upon diaphragm 39 to cause depression of button 38 and completion of the circuit to motor 1. As has been explained before, the liquid level required to start the motor may be determined by turning member 46 against the pressure of spring 51, since this will change the force exerted on the diaphragm 39 by the spring 51 and will therefore determine the counteracting pressure needed to move diaphragm 39 to depress button 38. When motor 1 starts, impeller 13 will be rotated and liquid will be pumped through opening 12 into enclosure 19 and out through outlet 14 and pipe 15. The position of opening 16, however, will also permit the output of the pump to travel up through openings 16 and 27 and passage 29 into enclosure 52 to press against diaphragm 39. Thus, once the apparatus has started to pump liquid the operation will continue regardless of the level of the liquid so long as there is still a sufficient amount in the sump to be drawn into inlet 12 by impeller 13. When the liquid level falls below that of impeller 13 it will then pump only air and the pressure will be insufficient to maintain diaphragm 39 distended and button 38 depressed. The circuit will therefore be broken and motor 1 will stop.

If there is only a very small amount of liquid in the sump originally, its level may be so low that even by adjustment of member 46 the motor cannot be started. In such a case, with the improved switch means of this invention it is merely necessary to push inwardly on head 50 of member 46. Since member 46 is securely attached to cup 42 of diaphragm 39, this will push the cup against button 38 and depress it to start the motor. The motor will stop as before when the liquid level descends below impeller 13.

Referring now to Figure 4, a modification of the invention will be described using like numerals for like parts. A switch 34 is provided with a button 38 protruding therefrom, the switch being adapted to complete the circuit to motor 1 when button 38 is depressed. A cup shaped member 42 again is adapted to press againstt button 38 and depress it upon an increase of pressure in the space 52. Member 46 is threaded into cup 42 by means of threaded portion 47, and extends through opening 49 in closure member 23. Member 46 terminates in a knurled head 50 positioned at a distance from closure member 23. Instead of the leaf spring 51 of Figures 1, 2 and 3, a coiled spring 53 is provided. A thin tubular member 54, preferably formed a flexible material, fits around spring 53 between closure member 23 and head 50, and has a flange 55 abutting head 50 and a flange 56 abutting closure member 23. Spring 53 presses against flanges 55 and 56 thereby creating a seal over opening 49 in closure member 23. In the embodiment of Figure 4, liquid from the diaphragm enclosure cannot leak past closure member 23 through opening 49 into the sump. Such a construction is highly advantageous where such leakage might be so large as to lower the pressure on diaphragm 39 thereby causing the pump to shut off sooner and thus lowering the pump output.

It will be seen that this invention provides a simple and economically manufactured construction whereby operation of the pump is started at a predetermined and adjustable liquid level and is continued until the liquid level falls below the pump impeller. In addition, the improved liquid level control switch of this invention provides for manually starting the pump where it is so desired when, for instance, the liquid level is above the pump impeller but is so low that it does not reach the diaphragm.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. A liquid level control switch comprising a closure member having an opening therein, a diaphragm secured to said closure member and forming an enclosure therewith, said enclosure being adapted to be connected to a source of fluid pressure, a retainer member having a centrally located aperture therein arranged to secure said diaphragm to said flange, said diphragm having a relatively thick central portion positioned to move through said aperture in said retainer member upon said deflection of said diaphragm, said central portion further having a recess opposite said opening, an internally threaded female insert secured within said recess, a threaded member engaged within said female member and extending through said opening, said threaded member terminating in a head spacedly positioned from said closure member, a coil spring located between said head and said closure member biasing said diaphragm toward said closure member, a thin flexible tubular member surrounding said spring and having an inwardly turned flange at each end to provide a seat for said spring, said thin flexible tubular member providing a hermetic seal to prevent leakage of liquid through said opening, said head being rotatable thereby to adjust the biasing effect of said spring, and an electric switch mechanism on the side of said diaphragm remote from said closure member, said head being forcible toward said closure member against the action of said spring to deflect said diaphragm, said diaphragm further being flexible a predetermined amount in response to a predetermined pressure in said enclosure variable by adjustment of said threaded member, said electric switch mechanism being positioned to be operable by said central portion upon said predetermined amount of flexing of said diaphragm either by occurrence of said predetermined pressure in said enclosure or by forcing of said head toward said closure member.

2. A liquid level control switch comprising a closure member having an opening therein, a diaphragm secured to said closure member and forming an enclosure therewith, said enclosure being adapted to be connected to a source of fluid pressure, a retainer member having an aperture centrally located therein and arranged to secure said diaphragm to said closure member, said diaphragm having a thick cup shaped central portion, said cup shaped portion having its recessed side opposite said opening, a threaded member rotatably engaged within said cup shaped portion and extending through said opening, said threaded member terminating in a head spaced from said closure member, spring means positioned between said head and said closure member biasing said diaphragm toward said closure member, said diaphragm being flexible away from said closure member a predetermined amount at a predetermined pressure within said enclosure, said diaphragm also being flexible away from said closure member by application of force from said head along the axis of said threaded member to cause said head to move toward said closure member against the bias of said spring means, said cup shaped member being positioned so as to move at least partly through said aperture when said predetermined pressure is attained or when force is applied on said head along the axis of said threaded member, means controlling the completion of an electric circuit positioned opposite said aperture on the side of said diaphragm remote from said closure member, said means being arranged to close said circuit when said cup shaped member is moved at least partly through said aperture, the bias of said diaphragm being adjustable by turning said threaded member.

3. A liquid level control switch comprising a closure member having an opening therein, a diaphragm secured to said closure member and forming an enclosure therewith, said enclosure being adapted to be connected to a source of fluid pressure, said diaphragm having a thick cup-shaped central portion, said cup-shaped portion having its recessed side opposite said opening, a threaded member rotatably engaged within said cup-shaped portion and extending through said opening, said threaded member terminating in a head spaced from said closure member, spring means positioned between said head and said closure member biasing said diaphragm toward said closure member, said diaphragm being flexible away from said closure member a predetermined amount at a predetermined pressure within said enclosure, said diaphragm also being flexible away from said closure member by application of force from said head along the axis of said threaded member to cause said head to move toward said closure member against the bias of said spring means, means controlling the completion of an electric circuit positioned adjacent said cup-shaped portion on the side of said diaphragm remote from said closure member, said cup shaped member being movable into engagement with said circuit controlling means when said predetermined pressure is attained or when force is applied on said head along the axis of said threaded member, said circuit controlling means being arranged to close said circuit when said cup-shaped member moves into engagement therewith, the bias of said diaphragm being adjustable by turning said threaded member.

References Cited in the file of this patent

UNITED STATES PATENTS

| | | |
|---|---|---|
| 2,320,121 | Durbin | May 25, 1943 |
| 2,395,007 | Leupold | Feb. 19, 1946 |
| 2,428,096 | Reavis | Sept. 30, 1947 |
| 2,429,440 | White | Oct. 21, 1947 |
| 2,435,716 | Kearney | Feb. 19, 1948 |
| 2,503,594 | Phelps | Apr. 11, 1950 |
| 2,553,291 | Barr | May 15, 1951 |
| 2,625,107 | Schaefer | Jan. 13, 1953 |
| 2,635,546 | Enyeart et al. | Apr. 21, 1953 |
| 2,687,693 | Hudson | Aug. 31, 1954 |